A. S. BALDWIN.
VEHICLE WHEEL.
APPLICATION FILED SEPT. 14, 1915.
1,352,168.
Patented Sept. 7, 1920.
2 SHEETS—SHEET 1.
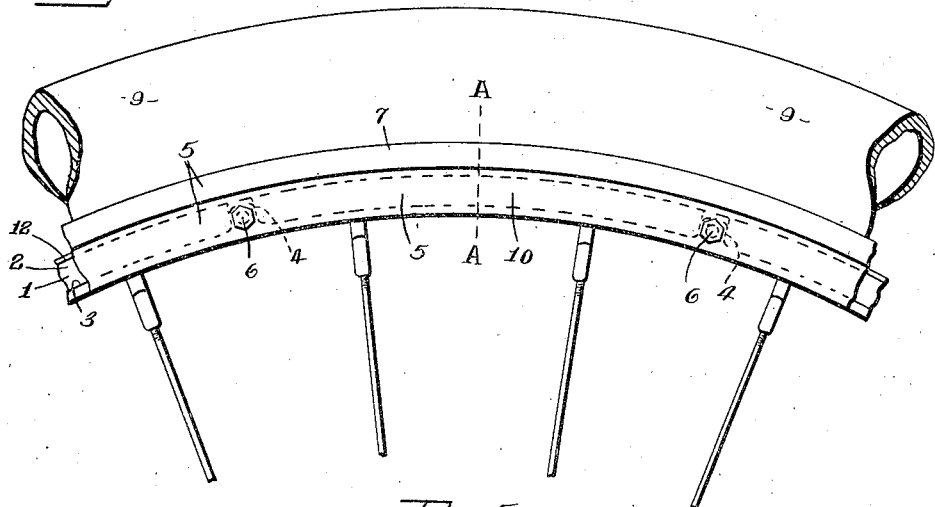
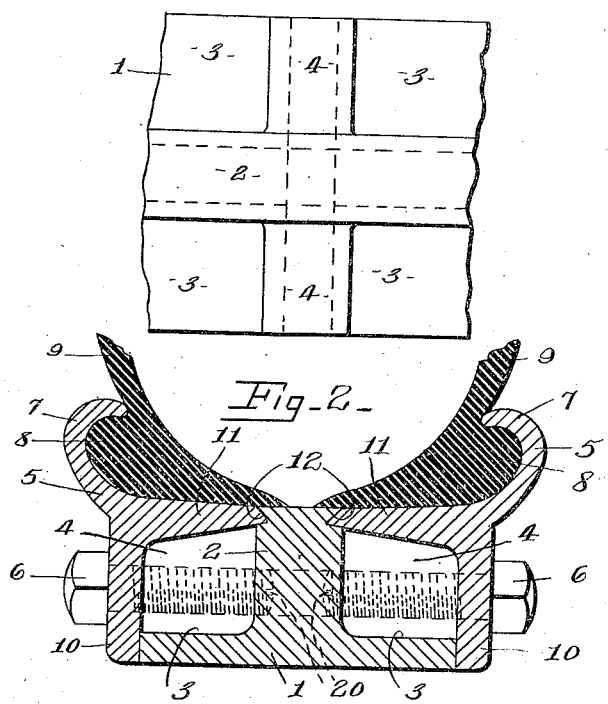
WITNESSES:
INVENTOR
Alfred S. Baldwin
BY
Parsons & Bidell
ATTORNEYS

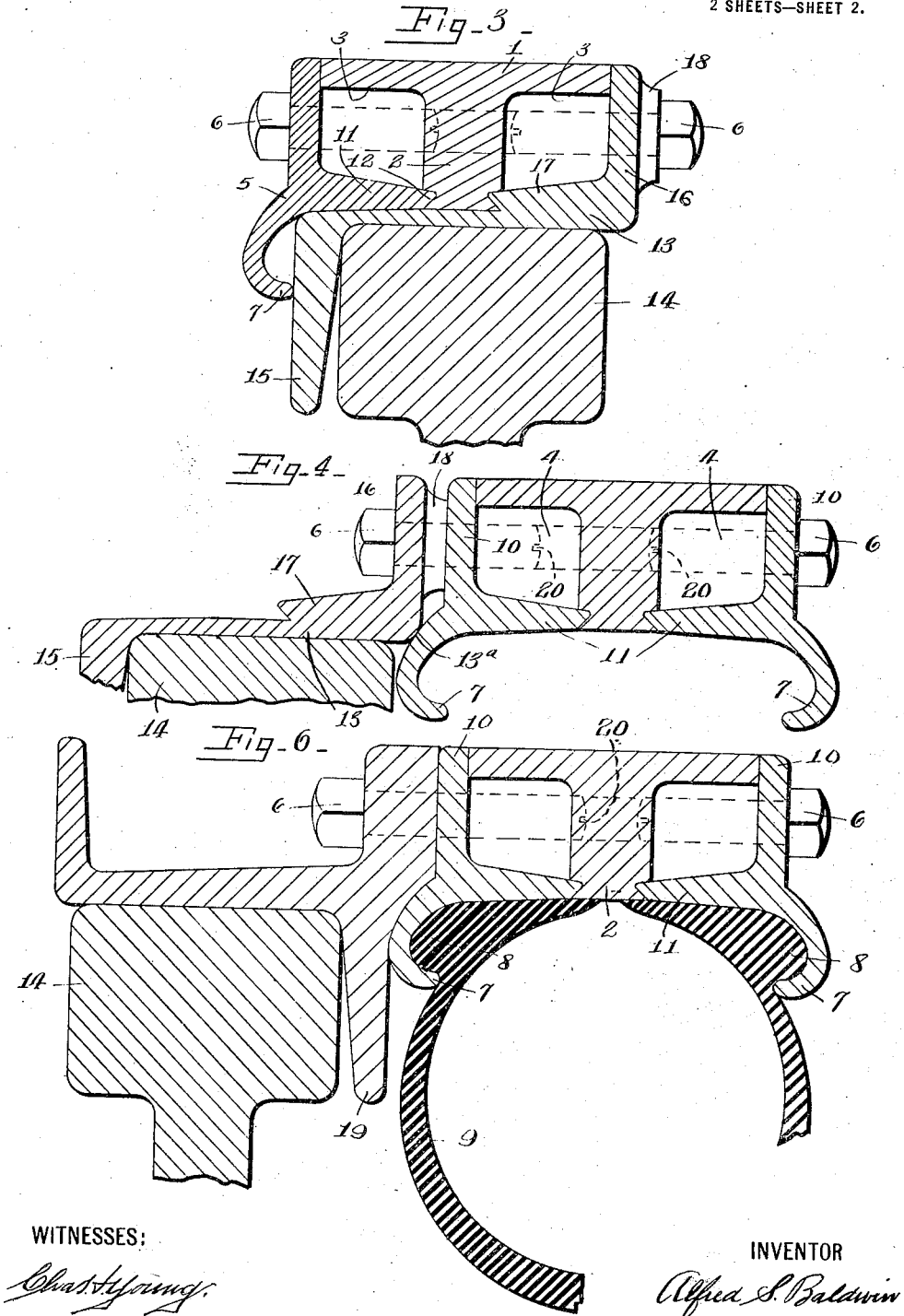

UNITED STATES PATENT OFFICE.

ALFRED S. BALDWIN, OF SYRACUSE, NEW YORK.

VEHICLE-WHEEL.

1,352,168.  Specification of Letters Patent.  Patented Sept. 7, 1920.

Application filed September 14, 1915. Serial No. 50,594.

*To all whom it may concern:*

Be it known that I, ALFRED S. BALDWIN, a citizen of the United States, residing at Syracuse, in the county of Onondaga and State of New York, have invented a certain new and useful Vehicle-Wheel, of which the following is a specification.

This invention has for its object a demountable rim by which automobiles or other vehicles of standard treads can be adapted to run on railroad tracks of standard gage, which rim is particularly simple in construction, highly efficient and durable in use and readily placeable on the wheel and removable therefrom.

Another object of the invention is a particularly simple and efficient demountable means for supporting the usual tire as the pneumatic tire of the vehicle.

In describing this invention, reference is had to the accompanying drawings in which like characters designate corresponding parts in all the views.

Figure 1 is a fragmentary elevation of a wheel embodying my invention.

Fig. 2 is an enlarged sectional view on line A—A, Fig. 1.

Fig. 3 is a cross-sectional view through the felly of the wheel and the flanged rim for running on a rail, when the rim is interchanged with the pneumatic tire, the rail being also shown.

Fig. 4 is a cross-sectional view through the felly of the wheel showing the demountable flanged rim mounted on a side of the wheel, a rail also being shown.

Fig. 5 is a fragmentary plan view of the periphery of the felly.

Fig. 6 is a view similar to Fig. 4 of a modified form of my invention, the rail and tire being also shown.

This vehicle wheel comprises generally a felly having demountable means for supporting a tire and a demountable flanged rim for running on a rail, said rim being mountable on the wheel on a side of the tire. Said demountable flanged rim is also preferably constructed to be interchangeable with the tire.

1 designates the felly of the wheel which may be the rim of the wheel if the wheel is a wire wheel, or may be a metal band or tire running around the wood part of the felly of a different type of wheel.

The felly 1 is here shown as formed with a central peripheral circumferential projection 2 and with recesses 3 on opposite sides of the projection 2 and also with laterally extending bosses 4 projecting at intervals from the central projection 2 to the side faces of the felly 1 and across the recesses 3.

The means for supporting a tire, in this embodiment of my invention, comprises demountable rim sections 5, the sections being annular in form and mounted on opposite sides of the felly 1, independently of each other, and being held in position by fastening members as cap screws 6 extending transversely through said sections 5 and into the bosses 4. The rim sections 5 are complemental to each other and are alike in construction, each being formed angular in cross-section and with a channel 7 projecting beyond the periphery of the felly in position to receive a bead 8 of the tire 9, and one of the flanges of each section 5 as the flange 10 extending radially inwardly and lapping the side of the felly, and the other flange 11 extending laterally toward the middle of the felly and forming a seat for the tire.

The flanges 10 and 11 close respectively the sides and the peripheries of the recesses 3, and the flanges 11 interlock with the projection 2 at the end thereof and have their peripheral surfaces flush with the periphery of the projection 2 so that the peripheries of said flanges 11 and of the projection 2 form the entire seat for the tire. As here shown the flanges 11 dovetail at 12 into the projection 2. The fastening members 6 extend through the flanges 10 of the sections 5.

13 is the demountable flanged rim for running on a rail as 14, this rim being constructed to be mounted on one side of the wheel and to be interchangeable with the tire. The rim 13 includes a tread portion, a flange 15 for engaging the rail and an inwardly and radially extending flange 16 similar to the flanges 10 of the rim sections 5. Said demountable rim 13 is also formed with a flange portion, 17 underlying the tread portion and similar to the flange 11 of each section 5. When the flanged rim 13 is mounted on one side of the wheel, the flange 16 thereof is opposed to the flange 10 and located close to the same, as seen in Fig. 4, and the fastening members 6 used for holding on said flange 10 are passed through the flange 16, the flange 10 of the opposing rim section 5 and into the bosses 4. The flange 16 is provided with suitable bosses or spacers 18 which abut against the opposing flange 10, and said rim 13 abuts at the outer angle of the tread portion of the rim and the flange 16 as at 13ª, against the outer face of the contiguous channel 7.

When the flanged rim 13 is interchanged with the tire 9, the tire 9 is removed and also one of the rim sections 5, and the demountable flanged rim 13 placed in position with its rail flange 15 against one of the channels 7 and with its flanges 16 and 17 occupying the positions previously occupied by the flanges 10 and 11 of the removed rim section, and the screws 6 placed in the same position as occupied before the removal of the rim section 5. The internal diameter of the rim section 13 is the same as the external diameter of the felly of the wheel and the flanges 11 so that said flanged rim 13 is interchangeable with the tire 9. In Fig. 6 the rim is shown as having its rail flange 19 located contiguous to the channel 7. The holes in which the cap screws 6 turn preferably extend through the bosses 4 and the projection 2, and said screws are slotted at 20 at their inner ends so that they can be turned out of the holes by a screw driver engaged with the slotted ends in case the outer ends of the screws are broken off.

The standard tread widths of ordinary vehicles are slightly greater or slightly less than the standard gage of railroad tracks and hence by my invention all standard automobiles can be equipped to run on railroad tracks.

The width of the tread of some vehicles is about that of the railroad tracks and these can be adapted to run on railroad tracks by my invention upon the removal of the pneumatic tire, and the placing of the flanged rims on the wheels in the position previously occupied by the tires.

My invention is particularly advantageous in that an automobile can be readily equipped therewith, and further in that it provides a simple and efficient means by which railroads can be utilized for automobile traffic if necessary for the transportation of troops and war supplies.

What I claim is:

The combination of a road wheel including a demountable tire rim section mountable upon one side of the felly and having a flange lapping the side of the felly, fastening means extending transversely through the felly to hold the rim section in position, a rail tire having a flange lapping the other side of the felly and coacting with said fastening means, and a peripheral flange adapted to seat on the demountable rim section, substantially as and for the purpose described.

In testimony whereof I have hereunto signed my name, at Syracuse, in the county of Onondaga, and State of New York, this 7th day of Sept., 1915.

ALFRED S. BALDWIN.